United States Patent [19]

Wimmer

[11] Patent Number: 4,560,998

[45] Date of Patent: Dec. 24, 1985

[54] LOW VOLTAGE TRANSFORMER COUPLED INK JET DRIVER

[75] Inventor: Guenther W. Wimmer, Portland, Oreg.

[73] Assignee: Tektronix, Inc., Beaverton, Oreg.

[21] Appl. No.: 631,969

[22] Filed: Jul. 18, 1984

[51] Int. Cl.[4] .............................................. G01D 15/16

[52] U.S. Cl. .................................. 346/140 R; 310/317

[58] Field of Search ........................... 346/140 PD, 75; 310/317, 326; 400/126; 363/39, 20, 40

[56] References Cited

U.S. PATENT DOCUMENTS 4,161,670 7/1979 Kern ............................ 346/140 PD 4,282,535 8/1981 Kern ............................ 346/140 PD

*Primary Examiner*—E. A. Goldberg

*Assistant Examiner*—Mark Reinhart

*Attorney, Agent, or Firm*—Allston L. Jones; Robert S. Hulse

[57] ABSTRACT

The invention consists of a transformer coupled low voltage power amplifiers which provides the moderate voltage (200–500 $V_{p-p}$) excitation potentials required by PZT ink jet or similar device elements. Transformer coupling is viable in that ink jet drive requirements are "return to zero" (no net DC component). Product safety aspects are enhanced since high voltage power supplies are not required, furthermore significant reductions in cost of implementation are realized due to the absence of high voltage power supplies and by allowing the use of monolithic power amplifiers. Savings in power may also be realized by matching the transformer to the ink jet PZT element as components of a resonant network.

5 Claims, 1 Drawing Figure

LOW VOLTAGE TRANSFORMER COUPLED INK JET DRIVER

BACKGROUND AND SUMMARY OF THE INVENTION

The present invention relates to ink jet printers, and more particularly to the driver for a piezoelectric crystal ink jet.

The typical driver for piezoelectric (PZT) crystal ink jets in the prior art consists of a linear high voltage amplifier which is generally D.C. coupled. This requires the use of components which can operate at high voltages (at least 250-500 volts peak-to-peak), and high voltage power supplies.

These drivers are high cost items and present a potential product safety problem. One factor is responsible for both of these; the high voltage requirements of the device. A linear amplifier which is capable of producing an output signal of up to 500 $V_{p-p}$ is an expensive item compared to a monolithic power amplifier which can produce an output signal in the 50 $V_{p-p}$ range. Additionally, these prior art drivers with their high voltage amplifier and high voltage power supplies create potential safety hazards.

An ink jet driver which uses a low cost, low power monolithic power amplifier with the higher voltages of the PZT only in the final stage is desirable. The present invention provides such a PZT driver.

In accordance with the illustrated embodiment, the present invention provides a low voltage PZT ink jet driver circuit for developing a high voltage PZT excitation signal in response to a low voltage video signal. The driver includes a power gain stage which is coupled to receive the low voltage video signal for amplifying that signal into a signal having a voltage level intermediate that of the input video signal and the necessary PZT excitation signal. Coupled to the output of the power gain stage is a serially connected capacitor-resistor network which in turn is coupled to the primary winding of a transformer means for stepping-up the video signal from the intermediate voltage level to the selected PZT excitation voltage across the secondary winding of the transformer means.

To maximize the power factor of the output power, the inductance of the secondary winding is matched to the average capacitance of the type of PZT ink jet selected to form a parallel resonant circuit therewith which has a resonant frequency at the selected droplet printing frequency. In turn then, the characteristics of the primary winding of the transformer means are set by the number of turns used in the secondary winding and the necessary turns ratio to obtain the desired voltage level in the excitation signal from the intermediate voltage levels of the video signal.

Additionally, the capacitor-resistor network and the primary winding form a series resonant circuit with the value of the capacitor selected to produce a resonant frequency that is substantially lower than the droplet frequency. The value of the resistor in the series resonant circuit is selected to minimize its Q and to critically damp or overdamp the series resonant circuit.

DESCRIPTION OF THE PREFERRED EMBODIMENT

Figure 1:
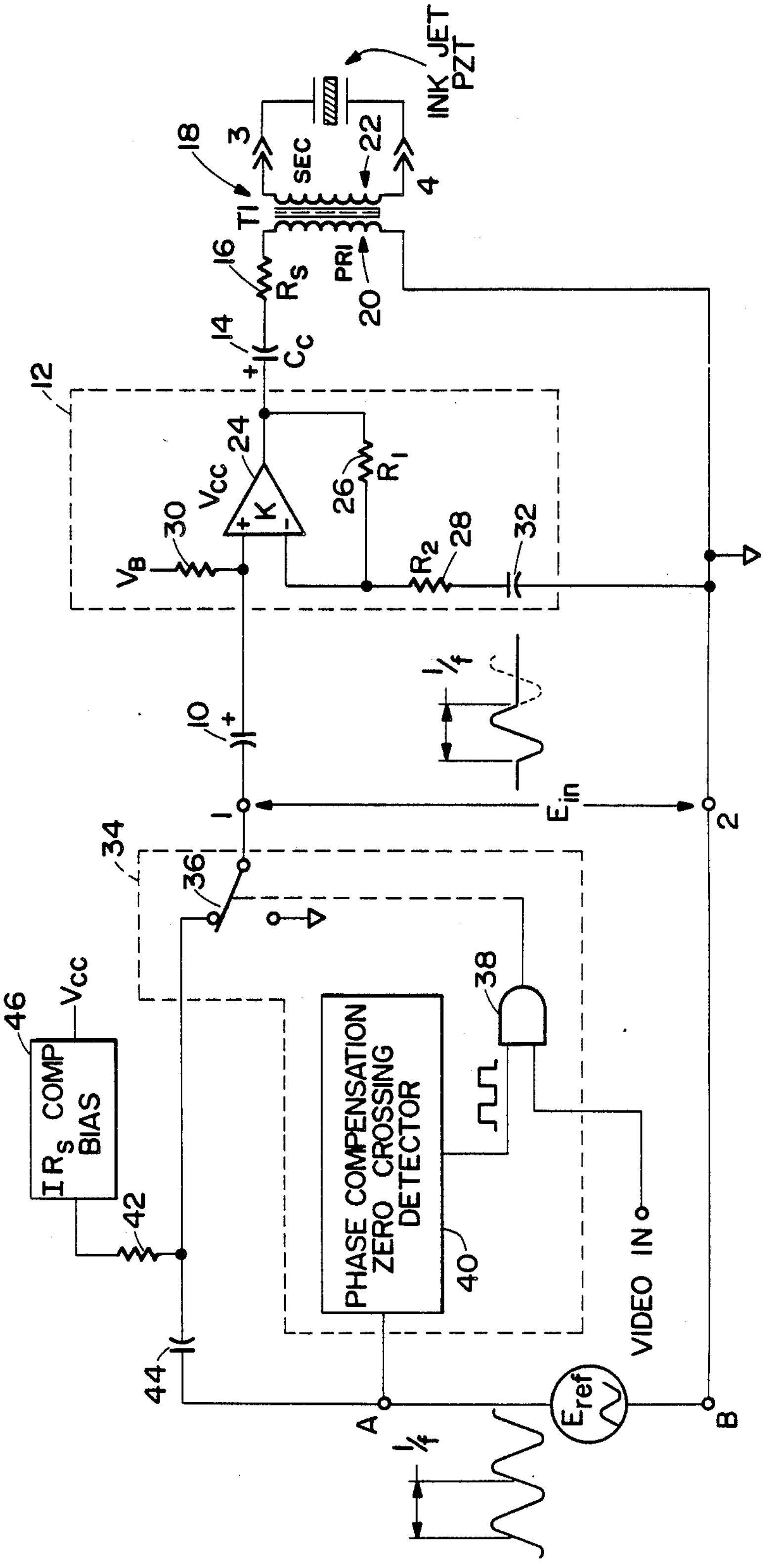
FIG. 1 is a schematic diagram of the PZT driver of the present invention.

In all ink jet printers, the image is printed a droplet, or dot, at a time, at a high frequency rate. A typical droplet printing rate is approximately 20 KHz. A properly designed driver must have the ability to turn the PZT ink jet on and off accurately, without printing too many or too few dots each time the driver is activated.

The signal which is applied to the driver may, for example, be a video signal that corresponds to a selected and stored image of a storage monitor. The video signal represents a string of the pixels of that image arranged in sequential lines across the face of the monitor as a composite of the individual pixel signals. Each pixel signal, depending on the resolution of the monitor, the brightness of that pixel in the image and the ink jet printer droplet size, triggers the release from the ink jet of one or more droplets of ink.

As a result of the nature of the video signal, each pixel signal portion of that signal consists of a "return to zero" signal. That is, each pixel signal starts at zero volts or at a zero voltage crossing point, and ends at zero volts or at a later zero voltage crossing point, e.g. a sine wave. Thus there is no net D.C. component in the video signal. That feature makes it possible to very reliably use a transformer coupled driver circuit.

In the schematic diagram of FIG. 1, there is shown a low voltage power gain stage 12 which is transformer 18 coupled to the PZT ink jet. Also shown is a capacitor 10 coupled serially between the driver input terminal 1 and the non-inverting input terminal of gain stage 12. Gain stage 12, in turn, includes gain setting resistors 26 and 28, having values of $R_1$ and $R_2$ respectively, and a power amplifier 24 which may be implemented by a monolithic power amplifier (e.g. SGS TDA 2030A). The output terminal of gain stage 12 is connected serially to a second capacitor 14 ($C_c$), resistor 16 ($R_s$), and then to the primary winding 20 of transformer 18 ($T_1$). The other end of the primary winding is then connected to the return line which is also input terminal 2. The ends of the secondary winding 22 of transformer 18 are connected to output terminals 3 and 4 which are disposed to couple with the PZT ink jet.

The voltage gain of the circuit shown in FIG. 1 is a combination of the gain of gain stage 12 and transformer 18. That gain can be expressed as follows:

$$\text{Voltage Gain} = \frac{R_1 + R_2}{R_2} \cdot \frac{N_s}{N_p} \quad (1)$$

where $N_p$ is the number of turns of the primary winding 20 of transformer 18 and $N_s$ is the number of turns of the secondary winding 22 of transformer 18.

The circuit of FIG. 1 includes two resonant circuits when the PZT ink jet is coupled to output terminals 3 and 4. The first resonant circuit is a series RLC circuit which includes $C_c$, $R_s$ and the primary winding 20. The second resonant circuit is a parallel LC circuit which includes the secondary winding 22 and the PZT ink jet.

To excite the PZT with a minimum of load on the power amplifier 24, the inductance of the secondary winding 22 should be matched to the capacitance of the PZT, so that the second resonant circuit resonates at the selected droplet frequency. Thus, given the value of inductance to produce resonance at that frequency and the characteristics of the selected transformer core, the number of secondary turns necessary to produce that inductance on that core can be determined.

By operating the second resonant circuit as close to resonance as possible, the power factor is maximized and the load appears to be less reactive and more real. By doing this, the load on the power amplifier is reduced with an overall power savings and a smaller thermal load on the power amplifier.

The number of turns in the primary winding 20 is set by the turns ratio which is necessary to obtain the necessary voltage gain (see Equation 1). For a typical PZT ink jet, an excitation signal of 250-500 $V_{p-p}$ is necessary to cause the production of the ink droplets on demand. If the input signal, $E_{in}$, at terminals 1 and 2 is 2.5-5.0 $V_{p-p}$, the necessary voltage gain in this example is 100, which is divided between power amplifier 24 and transformer 18. In the prototype of this circuit, a gain of 7 was selected for the power amplifier 24 and a turns ratio of transformer 18 of 14.4.

The first resonant circuit should be critically damped or overdamped, the Q of this circuit should be very low, and its resonant frequency should be lower and quite removed from the resonant frequency of the second resonant circuit. In the prototype of the driver circuit, the first resonant circuit was designed to have a resonant frequency of approximately 50 Hz and a Q of 1.4 or less.

As stated above, the first resonant circuit includes capacitor 14 ($C_c$) and $L_p$ (the inductance of primary winding 20) with resistor 16 ($R_s$) to control the Q of the circuit. It is necessary to control Q so that low frequency artifacts are not introduced into the printed output. The series damping resistor 16 also acts to swamp the effects of transformer leakage inductance which, if left unchecked, would degrade signal fidelity by introducing overshoot of the output signal at the termination of a droplet ejection cycle.

Assume a situation exists where a grouping of video information excites the ink jet in a burst having a half period that is harmonically related to the period of the first resonant circuit, and that pattern repeats with an equal length off period between bursts (i.e. alternating N pixels on and N pixels off in the video image), and that the first resonant circuit has a high Q. The first resonant circuit will develop an alternating potential at its resonant period which will be algebraically added to the pixel video information of the input signal. Therefore, a low frequency bias on the ink jet will exist, and since the PZT is a displacement device it would be biased in response to the low frequency envelope of the bursts, or the low frequency artifacts which affects the predictability of droplet ejection in an adverse fashion. By minimizing the Q of the first resonant circuit, there will be no appreciable buildup of low frequency energy and the ink jet will be controlled by the constituent signals of such a burst and not the envelope of the burst.

The inclusion of resistor 16 in the first resonant circuit introduces a low frequency artifact equal to the video envelope period having a magnitude $IR_s$, where I equals the current reflected at the transformer primary 20 transferred into or out of the second resonant circuit. The artifact will be algebraically added to the drive signal at the amplifier output and would compromise the performance and reliability of the ink jet.

The $IR_s$ offset voltage is compensated for through pre-compensation of the reference waveform to generate $E_{in}$. The pre-compensation circuit includes a synchronous waveform gate 34 coupled between terminal 1 and reference input terminals A and B with terminals A and B disposed to receive a reference signal, $E_{ref}$, which has a frequency substantially equal to the frequency of the individual pixel signal of the video-in signal. The synchronous waveform gate 34 includes a phase compensation zero crossing detector 40 having its input terminal connected to terminal A. The output signal from detector 40, as shown here, consists of a square wave which changes state each time the signal $E_{ref}$ crosses the zero voltage potential. One input terminal of AND gate 38 is connected to the output terminal of detector 40, and the second input terminal of gate 38 is disposed to receive the video data signal, the representative image of which is to be printed by the ink jet. The output signal from gate 38 in turn controls a DPDT switch 36 which is shown here as a mechanical switch, however, it is obvious to anyone skilled in the art that it can be replaced with an electronic switch of any of several types. The common terminal of switch 36 is connected to terminal 1. The poles of switch 36 are connected to the return line of the circuit and terminal A via a coupling capacitor 44. Also connected to the pole of switch 36 associated with capacitor 44 is a power supply 46 via resistor 42. The polarity of the output voltage of power supply 46 is controlled by detector 40 such that a bias voltage of a polarity opposite to that of the $IR_s$ voltage drop and of an appropriate magnitude is added to $E_{ref}$ prior to the gating of $E_{ref}$ by switch 36 under the control of the pixel information content of the video-in signal. Reference pre-compensation is completed through phase shifting the waveform gate an appropriate amount ($\text{sine}^{-}(V_{bias}/V_{peak\ reference})$) such that the apparent waveform gating occurs at the zero crossing of the exitation signal of the ink jet.

In the prototype of the invention the segments of the input signal, $E_{in}$, were 2.5 $V_{p-p}$ at 20 KHz, and the output signal was 250 $V_{p-p}$ at 20 KHz. The individual circuit components had the selected values or designations shown in the following table:

| | | | |
|---|---|---|---|
| $C_{10}$ | 1 uf. | $R_{30}$ | 20k ohms. |
| $C_{32}$ | 33 uf. | $R_1$ | 1k ohms. |
| $C_c$ | 330 uf. | $R_2$ | 169 ohms. |
| Power Amp. | SGS TDA 2030A | $R_s$ | 1.8 ohms. |
| $T_1$ | 14 × 8 mm Ferrite Pot Core | | |
| | $A_L = 250$ | $L_{PRI} = 160$ uhy (25 turns) | |
| $L_{SEC} = 31.5$ mhy (360 turns) | | $C_{PZT} = 1800$ pf | |

In production, the transformers could be individually adjusted to match the capacitance of a selected PZT ink jet, the PZT ink jets could be screened to select ones that have a capacitance within a preset tolerance range to match the selected transformer design, or the transformer could be designed to match the average or median value of the capacitance of the available PZT ink jets which all have the other specified characteristics. The first two of these options are very time and cost intensive, which in the production of a general use instrument would not be acceptable. Alternative three is the one which would be most often the one relied on to produce the instrument. During prototype testing it was noted that the second resonant circuit did not necessarily have a resonant frequency that was equal to the selected droplet frequency with a transformer which was designed to match the average capacitance of a sample of PZT ink jets, however, the resonant frequency was always sufficiently close to the droplet frequency for proper operation of the ink jet without the danger of overheating the power amplifier or introducing printing errors.

The invention herein described is the preferred embodiment thereof and changes and modifications thereto without departing from the invention in its broader aspects will be apparent to those skilled in the art. Such variations are not to be regarded as a departure from the spirit and scope of the invention and are intended to be included within the scope of the following claims.

What is claimed is:

1. A low voltage PZT ink jet driver circuit, wherein the PZT ink jet is capacitive, for developing, in response to a low voltage video signal, a high voltage PZT excitation signal to be applied to a PZT ink jet to excite said ink jet to print at a selected droplet frequency, said circuit comprising:

input terminal means for receiving the low voltage video signal;

power gain means coupled to the input terminal means for amplifying the low voltage video signal to produce a signal having an intermediate voltage level;

a serially connected capacitor-resistor network having one end coupled to the output terminal of the power gain means;

step-up transformer means, having a primary winding and a secondary winding, for stepping-up the video signal from the intermediate voltage level across the primary winding to the selected PZT excitation voltage level across the secondary winding, said primary winding being coupled between the other end of the capacitor-resistor network and the input terminal means; and output terminal means, coupled to the two ends of the secondary winding of the transformer means and disposed to have coupled thereto said PZT ink jet for applying said high voltage excitation signal to the PZT ink jet.

2. A low voltage PZT ink jet driver circuit as in claim 1 wherein the inductance value of the secondary winding of the transformer means is selected to complement the average capacitance of the type of PZT ink jet selected to form a parallel resonant circuit therewith having a resonant frequency at the selected droplet frequency.

3. A low voltage PZT ink jet driver circuit as in claim 2 wherein the turns ratio of the transformer means between the secondary and primary windings thereof is determined by the ratio of PZT excitation voltage level and the intermediate voltage level, and the characteristics of the primary winding are dependent on that ratio and the number of turns used to produce the desired inductance value of the secondary winding.

4. A low voltage PZT ink jet driver circuit as in claim 3 wherein the primary winding and the capacitor-resistor network form a series resonant circuit with the value of the capacitor being selected to produce a resonant frequency in this circuit which is substantially lower than the droplet frequency.

5. A low voltage PZT ink jet driver circuit as in claim 4 wherein the value of the resistor in the capacitor-resistor network is selected to minimize the Q of the series resonant circuit, and to damp the series resonant circuit sufficiently so that it is other than underdamped.

* * * * *